United States Patent

Shirota et al.

[11] Patent Number: 6,111,062
[45] Date of Patent: Aug. 29, 2000

[54] METHOD FOR PRODUCING A FLUORINATED ALICYCLIC STRUCTURE-CONTAINING POLYMER

[75] Inventors: Naoko Shirota; Yasuo Etoh; Norihide Sugiyama, all of Yokohama, Japan

[73] Assignee: Asahi Glass Company Ltd., Tokyo, Japan

[21] Appl. No.: 09/195,687

[22] Filed: Nov. 19, 1998

[30] Foreign Application Priority Data

Nov. 20, 1997 [JP] Japan ................................. 9-320123

[51] Int. Cl.⁷ ............................ C08G 65/22; C08G 73/24
[52] U.S. Cl. .................... 528/402; 528/461; 528/490; 528/935; 526/204; 526/247; 526/255; 525/326.2; 525/326.4
[58] Field of Search ................................ 528/402, 401, 528/490, 935; 526/204, 247, 255; 525/326.2, 326.4

[56] References Cited

U.S. PATENT DOCUMENTS

| | | |
|---|---|---|
| 3,085,083 | 4/1963 | Schreyer . |
| 4,946,902 | 8/1990 | Bekarian et al. ................. 525/326.2 |
| 5,076,659 | 12/1991 | Bekarian et al. ................. 385/143 |

FOREIGN PATENT DOCUMENTS

| | | |
|---|---|---|
| 0 226 668 | 7/1987 | European Pat. Off. . |
| 0 387 938 | 9/1990 | European Pat. Off. . |
| WO 89/12240 | 12/1989 | WIPO . |

OTHER PUBLICATIONS

Patent Abstracts of Japan, vol. 013, No. 039 (C–563), Jan. 27, 1989, JP 63 238111, Oct. 4, 1988.
Patent Abstracts of Japan, vol. 016, No. 509 (C–0997), Oct. 21, 1992, JP 04 189802, Jul. 8, 1992.

*Primary Examiner*—Duc Truong
*Attorney, Agent, or Firm*—Oblon, Spivak, McClelland, Maier & Neustadt, P.C.

[57] ABSTRACT

A method for producing a fluorinated alicyclic structure-containing polymer, which comprises contacting a fluorinated alicyclic structure-containing polymer having an unstable terminal group derived from a polymerization initiator and/or a chain transfer agent with fluorine gas in a fluorine-containing solvent, to convert the unstable terminal group to a stable terminal group and thereby to obtain a fluorinated alicyclic structure-containing polymer having substantially no unstable terminal group.

23 Claims, No Drawings

METHOD FOR PRODUCING A FLUORINATED ALICYCLIC STRUCTURE-CONTAINING POLYMER

The present invention relates to a method for producing a fluorinated alicyclic structure-containing polymer having substantially no unstable terminal group derived from a polymerization initiator and/or a chain transfer agent (hereinafter referred to as fluorinated polymer 1).

A film made of the fluorinated polymer 1 has an excellent transmittance of 90% of light at the whole region of the near infrared light rays, at the whole region of the visible light and at the region of the ultraviolet light rays having wavelengths of at most 250 nm and the fluorinated polymer 1 is useful as an optic resin material.

In a conventional method for producing the fluorinated polymer 1 (e.g. JP-A-4-189802), a "fluorinated alicyclic structure-containing polymer having an unstable terminal group derived from a polymerization initiator and/or a chain transfer agent" (hereinafter referred to as fluorinated polymer 2) was contacted directly with fluorine gas to convert the unstable terminal group to a stable terminal group and thereby to obtain the fluorinated polymer 1. Therefore, the polymer particles fused, and the obtained polymer was in a form of a hard board, and handling was difficult.

Further, the rate-determining factor for the fluorination reaction was the diffusion of the fluorine gas into a melt of the polymer particles, and in order to improve the diffusibility, an operation at the high temperature was required. Therefore, volume efficiency and reactivity were low, and to obtain the predetermined properties, a long period of time for contact was required, which lowered productivity.

It is an object of the present invention to solve the problems of the conventional method for producing the fluorinated polymer 1, and to provide a method for producing the fluorinated polymer 1, wherein the reaction speed is high, volume efficiency is good, operation efficiency after treatment is good, peeling property of the thin layer of the coated fluorinated polymer 1 from a substrate is excellent and light transmission of the film made of the fluorinated polymer 1 is excellent.

The present invention provides a method for producing a fluorinated polymer 1, which comprises contacting the fluorinated polymer 2 with fluorine gas, to convert the unstable terminal group in the fluorinated polymer 2 to a stable terminal group.

The reaction of the fluorinated polymer 2 dissolved in a fluorine-containing solvent with the fluorine gas is an exothermic reaction, and the fluorine gas is highly reactive to the material of a container for the reaction. Therefore, it is preferred to dilute the fluorine gas with an innert gas such as nitrogen gas. The ratio of the fluorine gas in the mixed gas of the fluorine gas and the innert gas is preferably from 10 to 40 vol %.

The fluorine gas is supplied usually at a ratio of from 10 to 100 ml per g of the fluorinated polymer 2 under standard condition. The fluorine gas may be supplied by a batch system, or may be supplied continuously. The reaction pressure is usually from atmospheric pressure to 3 MPa·G, preferably from atmospheric pressure to 2 MPa·G. The reaction temperature is usually from 100 to 300° C., but considering the practical treatment time, it is preferably at least 170° C., and considering the pressure resistance of the container and safety, it is preferably at most 230° C. The reaction time tends to be long when the reaction temperature is low, and the reaction time tends to be short when the reaction temperature is high. When the reaction temperature is from 170 to 230° C., the suitable reaction time is from 3 to 20 hours.

As the material of the container for the reaction, nickel, a nickel alloy, aluminium, an aluminium alloy, Monel (tradename of a nickel alloy), inconel (tradename of a nickel alloy), Hastelloy (tradename of a nickel alloy), carbon steel or stainless steel is preferred, and nickel or a nickel alloy is more preferred.

The fluorine-containing solvent is not particularly limited, so long as it is capable of dissolving or dispersing the fluorinated polymer 2 therein. However, a perfluoro compound or a fluorine-containing perhalo compound is preferred, since the solvent and the fluorine gas are directly contacted. Particularly, perfluorobenzene, perfluoro(2-butyltetrahydrofuran), a perfluorotrialkylamine $N(C_nF_{2n+1})_3$ (wherein n is an integer of from 2 to 4), a perfluoroalkane $C_nF_{2n+2}$ (wherein n is an integer of from 6 to 8) or a fluorinated chlorine-containing perhaloalkane $F(CFClCF_2)_n Cl$ (wherein n is an integer of from 1 to 7) is preferred. The fluorine-containing solvent may be used as a mixture of two or more of them. It is preferred to dissolve the fluorinated polymer 2 in the fluorine-containing solvent, since the fluorination efficiency is thereby good.

The unstable terminal group in the fluorinated polymer 2 is a terminal group derived from a polymerization initiator and/or a chain transfer agent during the production of the fluorinated alicyclic structure-containing polymer. The unstable terminal group includes a —$COOR^1$ group, wherein $R^1$ is a $C_{1-10}$ alkyl group, derived from a polymerization initiator; a —COH group in a —$R^2OH$ group, wherein $R^2$ is a $C_{1-10}$ alkylene group, derived from a chain transfer agent; a —COF group, produced by fluorination of a —$COOR^1$ group; and a —COF group produced by fluorination of a —COH group. The unstable terminal group is finally converted to a stable —$CF_3$ group after fluorination.

In the present invention, having substantially no unstable terminal group is judged by measuring the infrared absorption spectrum of the compression-formed film of the fluorinated polymer 1 (thickness: 200 μm), and confirming no existence of —COF group having a characteristic absorption at 1883 cm$^{-1}$.

As the fluorinated alicyclic structure-containing polymer, preferred is one obtained by polymerization of a monomer having a fluorinated cyclic structure, or a polymer having a fluorinated alicyclic structure in the main chain, obtained by cyclic polymerization of a fluorine-containing monomer having at least two polymerizable double bonds.

"Having a fluorinated alicyclic structure in the main chain" means having a structure wherein at least one carbon atom constituting the aliphatic ring is a carbon atom in the carbon chain constituting the main chain, and a fluorine atom or a fluorine-containing group is bonded to at least one part of carbon atoms constituting the aliphatic ring.

The polymer having a fluorinated alicyclic structure in the main chain, obtained by polymerization of a monomer having a fluorinated cyclic structure, has been known by JP-B-63-18964. Namely, the polymer having a fluorinated alicyclic structure in the main chain can be obtained by homopolymerization of a monomer having a fluorinated cyclic structure such as perfluoro(2,2-dimethyl-1,3-dioxole), or copolymerization of the monomer and a radical polymerizable monomer having no fluorinated cyclic structure, such as tetrafluoroethylene, chlorotrifluoroethylene or perfluoro (methyl vinyl ether).

Further, the polymer having a fluorinated alicyclic structure in the main chain, obtained by cyclic polymerization of a fluorine-containing monomer having at least two polymerizable double bonds, has been known by JP-A-63-238111 or JP-A-63-238115. Namely, the polymer having a fluorinated alicyclic structure in the main chain can be obtained by cyclic polymerization of a monomer such as perfluoro(allyl vinyl ether) or perfluoro(butenyl vinyl ether), or copolymerization of such a monomer and a radical polymerizable monomer which does not undergo cyclic polymerization, such as tetrafluoroethylene, chlorotrifluoroethylene or perfluoro(methyl vinyl ether).

Further, the polymer having a fluorinated alicyclic structure in the main chain can be obtained by copolymerization of a monomer having a fluorinated cyclic structure, such as perfluoro(2,2-dimethyl-1,3-dioxole) and a fluorine-containing monomer having at least two polymerizable double bonds, such as perfluoro(allyl vinyl ether) or perfluoro(butenyl vinyl ether).

The fluorinated alicyclic structure-containing polymer contains preferably at least 20 mol %, particularly preferably at least 40 mol %, of polymer units having a fluorinated alicyclic structure, based on the total polymer units of the fluorinated alicyclic structure-containing polymer, in view of transparency and mechanical properties.

The fluorinated alicyclic structure-containing polymer may, for example, be one having repeating units selected from the following formulae (1) to (4). The fluorine atoms in the fluorinated alicyclic structure-containing polymer may be partly substituted by chlorine atoms in order to increase the refractive index.

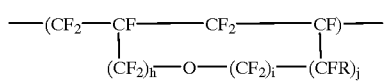    (1)

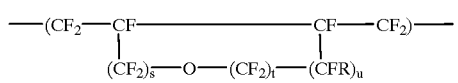    (2)

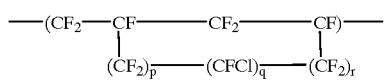    (3)

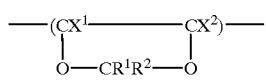    (4)

wherein h is an integer of from 0 to 5, i is an integer of from 0 to 4, j is 0 or 1, h+i+j is an integer of from 1 to 6, s is an integer of form 0 to 5, t is an integer of from 0 to 4, u is 0 or 1, s+t+u is an integer of from 1 to 6, each of p, q and r which are independent of one another, is an integer of from 0 to 5, p+q+r is an integer of from 1 to 6, each of R, $R^1$, $R^2$, $X^1$ and $X^2$ which are independent of one another, is F, Cl, D (deuterium) or $CF_3$.

As the monomer having a fluorinated cyclic structure of the present invention, preferred is a monomer selected from compounds of the following formulae (5) to (7).

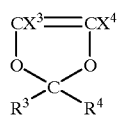    (5)

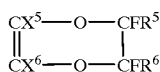    (6)

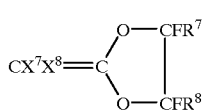    (7)

wherein each of $X^3$ to $X^8$, and $R^3$ to $R^8$, which are independent of one another, is F, Cl, D or $CF_3$, or $R^3$ and $R^4$, $R^5$ and $R^6$, or $R^7$ and $R^8$ may be bonded to form a ring.

Specific examples of compounds of the formulae (5) to (7) include compounds of the formulae (11) to (18).

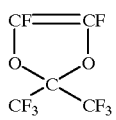    (11)

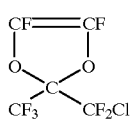    (12)

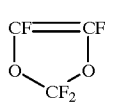    (13)

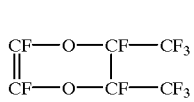    (14)

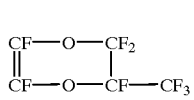    (15)

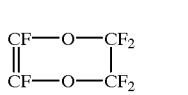    (16)

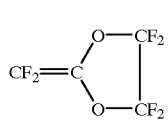    (17)

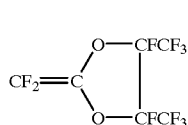    (18)

As the fluorine-containing monomer having at least two polymerizable double bonds, compounds of the following formulae (8) to (10) are preferred.

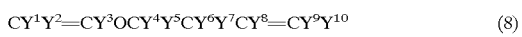    (8)

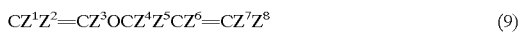    (9)

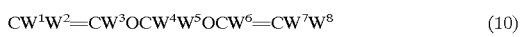    (10)

wherein each of $Y^1$ to $Y^{10}$, $Z^1$ to $Z^8$ and $W^1$ to $W^8$, which are independent of one another, is selected from F, Cl, D and $CF_3$.

Specific examples of compounds of the formulae (8) to (10) include the following compounds.

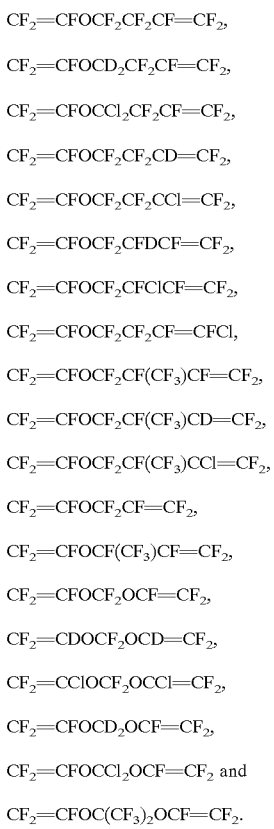

The fluorinated polymer 1 obtained by the present invention may be used for various applications utilizing its properties. For example, it is used for an optical use such as an optical fiber, a pellicle film (a stain-proofing cover for photomasks), a lens or an optical cell, since it is excellent in transparency or light transmittance. Further, it is useful for a mold releasing agent since it is excellent in a releasing property from a substrate.

For the lithographic step of the pellicle film, a light of ultraviolet light region with a short wavelength is used. However, the fluorinated polymer 1 of the present invention has an excellent durability since it is highly ultraviolet light resistant.

Now, the present invention will be described in further detail with reference to Synthesis Examples (Examples 1 to 3), working Examples (Examples 4 to 6) and Comparative Examples (Examples 7 and 8). However, it should be understood that the present invention is by no means restricted to such specific Examples.

EXAMPLE 1

35 g of perfluoro(butenyl vinyl ether) [PBVE], 150 g of deionized water and 90 mg of a polymerization initiator [((CH$_3$)$_2$CHOCOO)$_2$] were put in a pressure glass autoclave having an internal volume of 200 ml. The system was substituted with nitrogen three times, followed by suspension polymerization for 22 hours at the temperature of 40° C. As a result, 30 g of a polymer having a number average molecular weight of about 1.5×10$^5$ (hereinafter referred to as polymer A) was obtained.

The intrinsic viscosity [η] of the polymer A was 0.50 in perfluoro(2-butyltetrahydrofuran) [PBTHF] at 30° C. The glass transition point of the polymer A was 108° C., and the polymer A was a tough and transparent glass like polymer at room temperature. The 10% thermal decomposition temperature was 465° C., and the refractive index was 1.34. As the result of measuring the infrared absorption spectrum of the compression-formed film of the polymer A (thickness: 200 μm), the characteristic absorption at 1883 cm$^{-1}$ derived from —COF groups was confirmed.

EXAMPLE 2

Perfluoro(2,2-dimethyl-1,3-dioxole) [PDD] and tetrafluoroethylene at a weight ratio of 70:30 were radical polymerized to obtain a polymer having a glass transition point of 160° C. and a number average molecular weight of about 5×10$^5$ (hereinafter referred to as polymer B). The polymer B was colorless and transparent, its refractive index was 1.31, and its light transmittance was high. As a result of measuring the infrared absorption spectrum of the compression-formed film of the polymer B (thickness: 200 μm), the characteristic absorption at 1883 cm$^{-1}$ derived from —COF groups was confirmed.

EXAMPLE 3

6 g of PBVE, 4 g of PDD, 10 g of PBTHF and 20 mg of a polymerization initiator [((CH$_3$)$_2$CHOCOO)$_2$] were put in a pressure glass ample having an internal volume of 50 ml. The system was substituted with nitrogen three times, followed by polymerization for 20 hours at a temperature of 40° C. As a result, 7.7 g of a transparent polymer having a number average molecular weight of about 1.5×10$^5$ (hereinafter referred to as polymer C) was obtained.

The glass transition point of the polymer C was 155° C., and the refractive index was 1.32. The polymer unit content of PDD obtained by absorbancy of absorption at 1930 cm$^{-1}$ of IR spectrum, was 55 wt %. As a result of measuring the infrared absorption spectrum of the compression-formed film of the polymer C (thickness: 200 μm), the characteristic absorption at 1883 cm$^{-1}$ derived from —COF groups was confirmed.

EXAMPLE 4

An autoclave of 1 l made of nickel were evacuated to −760 Torr, and 1,000 g of a solution having the polymer A dissolved in perfluorotributylamine [PTBA] so that the concentration of the polymer A was 6 wt %, was charged thereto under reduced pressure. Then, fluorine gas diluted by nitrogen gas to the concentration of 20 vol % (hereinafter referred to as 20% diluted fluorine gas) was introduced into the system to 0.7 MPa·G, followed by treatment under stirring for ten hours at the temperature of 195° C., to obtain a polymer (hereinafter referred to as polymer D). As a result of measuring the infrared absorption spectrum of the compression-formed film of the polymer D (thickness: 200 μm), no characteristic absorption at 1883 cm$^{-1}$ derived from —COF groups was confirmed.

The PTBA solution of the polymer D was coated on a glass plate by a spin coating method, and curing was carried out at a temperature of 180° C., to form a film having a thickness of 1 μm. The film made of the polymer D was excellent in a releasing property from the glass plate, and 90 degree peeling strength was 3 gf/cm.

EXAMPLE 5

The same operation as in Example 4 was carried out except that the polymer B was used instead of the polymer A, to obtain a polymer (hereinafter referred to as polymer E). As a result of measuring the infrared absorption spectrum of the compression-formed film of the polymer E (thickness: 200 μm), no characteristic absorption at 1883 cm$^{-1}$ derived from —COF groups was confirmed.

An optical fiber was formed wherein the polymer E was a cladding part and the polymer D was a core part. The transmission loss of the optical fiber was 150 dB/km at 650 nm and 60 dB/km at 1330 nm.

EXAMPLE 6

The same operation as in Example 4 was carried out except that the polymer C was used instead of the polymer A, to obtain a polymer (hereinafter referred to as polymer F). As a result of measuring the infrared absorption spectrum of the compression-formed film of the polymer F (thickness: 200 μm), no characteristic absorption at 1883 cm$^{-1}$ derived from —COF groups was confirmed.

An optical fiber was formed wherein the polymer F was a cladding part and the polymer D was a core part. The transmission loss of the optical fiber was 150 dB/km at 650 nm and 60 dB/km at 1330 nm.

EXAMPLE 7

The polymer A was dissolved in PTBA and adjusted to a concentration of 6 wt %. The solution was coated on a glass by a spin coating method, followed by curing at a temperature of 180° C., and then a film having a thickness of 1 μm was formed. The film made of the polymer could not be separated from the glass plate under a humidity of 40%.

EXAMPLE 8

60 g of the polymer A was put in an autoclave of 1 l made of nickel, and the system was substituted with nitrogen three times, followed by evacuation to −30 Torr. Then, the 20% diluted fluorine gas was introduced to the system to 0.7 MPa·G, followed by treatment for ten hours at a temperature of 195° C., to obtain a polymer (hereinafter referred to as polymer G). As a result of measuring the infrared absorption spectrum of the compression-formed film of the polymer G (thickness: 200 μm), the characteristic absorption at 1883 cm$^{-1}$ derived from —COF groups was confirmed.

The polymer G was dissolved in PTBA and adjusted to a concentration of 6 wt %. The solution was coated on a glass by a spin coating method, followed by curing at a temperature of 180° C., to form a film having a thickness of 1 μm The 90 degree peeling strength of the film made of the polymer was 20 gf/cm under a humidity of 40%. Further, parts of the obtained film were elongated, and an uniform film could not be obtained.

An optical fiber was produced wherein the polymer E was a cladding part and the polymer G was a core part. The transmission loss of the optical fiber was 500 dB/km at 650 nm and 200 dB/km at 1330 nm.

The present invention provides a method for producing the fluorinated polymer 1 which is excellent in a releasing property from a substrate and light transmittance, wherein the reaction speed is high, the volume efficiency is good and the operation efficiency after treatment is excellent. The light transmission loss of the optical fiber made of the fluorinated polymer 1 obtained, can be made as low as 300 dB/km or less at a wavelength of from 500 to 1300 nm.

What is claimed is:

1. A method for producing a fluorinated alicyclic structure-containing polymer, which comprises contacting a fluorinated alicyclic structure-containing polymer having an unstable terminal group derived from a polymerization initiator and/or a chain transfer agent with fluorine gas in a fluorine-containing solvent, to convert the unstable terminal group to a stable terminal group and thereby to obtain a fluorinated alicyclic structure-containing polymer having substantially no unstable terminal group.

2. The method according to claim 1, wherein the fluorine-containing solvent is a perfluoro compound or a fluorine-containing perhalo compound.

3. The method according to claim 2, wherein the perfluoro compound is a perfluorotrialkylamine or perfluoro(2-butyltetrahydrofuran).

4. The method according to claim 1, wherein the unstable terminal group is a —COOR$^1$ group, wherein R$^1$ is a C$_{1-10}$ alkyl group, a —COH group or a —COF group.

5. The method according to claim 1, wherein the stable terminal group is a —CF$_3$ group.

6. The method according to claim 1, wherein the temperature for the reaction of the fluorinated alicyclic structure-containing polymer having an unstable terminal group with the fluorine gas is from 100° C. to 300° C.

7. The method according to claim 1, wherein the fluorine gas is supplied at a ratio of from 10 to 100 ml per g of the fluorinated alicyclic structure-containing polymer having an unstable terminal group under standard condition.

8. The method according to claim 1, wherein the reaction pressure is from atmospheric pressure to 3 MPa·G.

9. The method according to claim 1, wherein the fluorinated alicyclic structure-containing polymer contains at least 20 mol % of polymer units having a fluorinated alicyclic structure, based on the total polymer units of the fluorinated alicyclic structure-containing polymer.

10. The method according to claim 1, wherein the fluorinated alicyclic structure-containing polymer is a polymer obtained by polymerization of a monomer having a fluorinated cyclic structure.

11. The method according to claim 1, wherein the fluorinated alicyclic structure-containing polymer is a polymer obtained by cyclic polymerization of a fluorine-containing monomer having at least two polymerizable double bonds.

12. The method according to claim 1, wherein the fluorinated alicyclic structure-containing polymer is a polymer obtained by copolymerization of a monomer having a fluorinated cyclic structure and a fluorine-containing monomer having at least two polymerizable double bonds.

13. The method according to claim 1, wherein the fluorinated alicyclic structure-containing polymer is a polymer made by copolymerization of a monomer having a fluorinated cyclic structure and a radical polymerizable monomer having no fluorinated cyclic structure.

14. The method according to claim 13, wherein the radical polymerizable monomer having no fluorinated cyclic structure is tetrafluoroethylene, chlorotrifluoroethylene or perfluoro(methyl vinyl ether).

15. The method according to claim 1, wherein the fluorinated alicyclic structure-containing polymer is a polymer made by copolymerization of a fluorine-containing monomer having at least two polymerizable double bonds and a radical polymerizable monomer which does not undergo cyclic polymerization.

16. The method according to claim 15, wherein the radical polymerizable monomer which does not undergo cyclic polymerization is tetrafluoroethylene, chlorotrifluoroethylene or perfluoro(methyl vinyl ether).

17. The method according to claim 10, wherein the monomer having a fluorinated cyclic structure is perfluoro (2,2-dimethyl-1,3-dioxole).

18. The method according to claim 12, wherein the monomer having a fluorinated cyclic structure is perfluoro (2,2-dimethyl-1,3-dioxole).

19. The method according to claim 13, wherein the monomer having a fluorinated cyclic structure is perfluoro (2,2-dimethyl-1,3-dioxole).

20. The method according to claim 11, wherein the fluorine-containing monomer having at least two polymerizable double bonds is perfluoro(allyl vinyl ether) or perfluoro(butenyl vinyl ether).

21. The method according to claim 12, wherein the fluorine-containing monomer having at least two polymerizable double bonds is perfluoro(allyl vinyl ether) or perfluoro(butenyl vinyl ether).

22. The method according to claim 15, wherein the fluorine-containing monomer having at least two polymerizable double bonds is perfluoro(allyl vinyl ether) or perfluoro(butenyl vinyl ether).

23. A method for producing a fluorinated alicyclic structure-containing polymer which comprises contacting with fluorine gas a fluorinated alicyclic structure-containing polymer having an unstable terminal group derived from a polymerization initiator and/or a chain transfer agent, said polymer being dissolved in a fluorine-containing solvent when contacted with said fluorine gas, to convert the unstable terminal group to a stable terminal group and thereby to obtain a fluorinated alicyclic structure-containing polymer having substantially no unstable terminal group.

* * * * *